United States Patent
Tanaka

(10) Patent No.: US 6,882,682 B1
(45) Date of Patent: Apr. 19, 2005

(54) FIXED PATTERN DETECTION APPARATUS

(75) Inventor: Hiroki Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 701 days.

(21) Appl. No.: 09/699,553

(22) Filed: Oct. 31, 2000

(30) Foreign Application Priority Data

Nov. 1, 1999 (JP) .......................................... 11-311621

(51) Int. Cl.[7] .............................................. H04B 1/707
(52) U.S. Cl. ..................................... 375/150; 375/343
(58) Field of Search ................................. 375/130, 140, 375/141, 142, 143, 147, 150, 152, 340, 343, 354; 370/320, 342

(56) References Cited

U.S. PATENT DOCUMENTS

| | | | |
|---|---|---|---|
| 5,764,690 A | * | 6/1998 | Blanchard et al. .......... 375/147 |
| 5,844,937 A | * | 12/1998 | Zhou et al. .................. 375/152 |
| 2001/0019578 A1 | * | 9/2001 | Arima ......................... 375/150 |
| 2003/0048901 A1 | * | 3/2003 | Cangiani et al. ............ 380/252 |

FOREIGN PATENT DOCUMENTS

| | | | | |
|---|---|---|---|---|
| JP | 10215240 A | * | 8/1998 | ............. H04L/7/00 |
| JP | 200194468 A | * | 4/2001 | ........... H04B/1/707 |
| WO | WO 97/17789 A1 | | 5/1997 | |
| WO | WO 99/30433 A1 | | 6/1999 | |

OTHER PUBLICATIONS

"Spreading and modulation (FDD)", Technical Specification, TS 25.213 V2.3.0, Sep., 1999, pp. 1–27.

* cited by examiner

*Primary Examiner*—Chieh M. Fan
(74) *Attorney, Agent, or Firm*—Sughrue Mion, PLLC

(57) ABSTRACT

A fixed pattern detection device in which the device is fed as a received signal with a pattern of a length of N chips. The received signal is obtained by dividing and re-arraying each of K (integer) symbols in terms of a chip period as a unit, each symbol being spread with the spread code (PN) at a rate of M (integer) chips per symbol, and on repeatedly inserting into the re-arrayed symbols a signature pattern of a length K having one chip period as a unit, by M times, where N=K×M. The device includes first-stage correlators taking correlation between M received signals and M spread code sequences obtained on decimating a spread code sequence of a length N, and a second stage correlators taking correlation between the correlation values associated with K signatures output by the first-stage correlators and a pre-defined signature pattern.

14 Claims, 12 Drawing Sheets

FIG. 5

| | 0 | 1 | 2 | ... | L/K | ... | M−1 | M | M+1 | ... | M+L/K−1 |
|---|---|---|---|---|---|---|---|---|---|---|---|
| CORRELATOR BLOCK ##0 #0 | $C_0S_0$ | $C_0S_K$ | $C_0S_{2K}$ | ... | ... | ... | $C_{(M-1)K}S_{(M-1)K}$ | | | | |
| #1 | | $C_KS_0$ | $C_KS_K$ | ... | $C_0S_0$ | ... | $C_{(M-1)K}S_{(M-2)K}$ | $C_{MK}S_{(M-1)K}$ | | | |
| #2 | | | $C_{2K}S_0$ | ... | | ... | $C_{(M-1)K}S_{(M-3)K}$ | $C_{MK}S_{(M-2)K}$ | $C_{(M+1)K}S_{(M-1)K}$ | ... | |
| #L/K | | | | ... | $C_TS_0$ | ... | $C_{(M-1)K}S_{(M-1)K+1}$ | | | ... | $C_{T+(M-1)K}S_{(M-1)K}$ |
| CORRELATOR BLOCK ##1 #0 | | $C_0S_1$ | $C_{2K}S_{K+1}$ | | | | | $C_{MK}S_{(M-1)K+1}$ | | | |
| #1 | | $C_KS_1$ | $C_{2K}S_1$ | | $C_TS_1$ | | $C_{(M-1)K}S_{(M-1)K+2}$ | | | | $C_{T+(M-1)K}S_{(M-1)K+1}$ |
| #L/K | | | | | | | | | | | |
| CORRELATOR BLOCK ##2 #0 | $C_0S_2$ | $C_KS_2$ | $C_{2K}S_{K+2}$ | | $C_TS_2$ | | | $C_{MK}S_{MK-1}$ | | | $C_{T+(M-1)K}S_{(M-1)K+2}$ |
| #1 | | $C_KS_{K-1}$ | $C_{2K}S_{2K-1}$ | | | | $C_{(M-1)K}S_{MK-1}$ | $C_{MK}S_{MK-1}$ | | | |
| #L/K | | | | | | | | | | | |
| CORRELATOR BLOCK ##K−1 #0 | $C_0S_{K-1}$ | $C_KS_{2K-1}$ | $C_{2K}S_{3K-1}$ | | | | $C_{(M-1)K}S_{MK-1}$ | | | | |
| #1 | | | | | | | | | | | |
| #L/K | | | | | $C_TS_{K-1}$ | | | | | | $C_{T+(M-1)K}S_{MK-1}$ |

FIG. 6

| | | 0 | 1 | 2 | ... | L/K | ... | M-1 | M | M+1 | ... | M+L/K-1 |
|---|---|---|---|---|---|---|---|---|---|---|---|---|
| CORRELATOR BLOCK ##0 | #0 | $C_1S_0$ | $C_{K+1}S_K$ | $C_{2K+1}S_{2K}$ | ... | ... | ... | $C_{(M-1)K+1}S_{(M-1)K}$ | $C_{MK+1}S_{(M-1)K}$ | | | |
| | #1 | | $C_{K+1}S_0$ | $C_{2K+1}S_K$ | ... | | ... | $C_{(M-1)K+1}S_{(M-2)K}$ | $C_{MK+1}S_{(M-1)K}$ | $C_{(M-1)K+1}S_{(M-1)K}$ | ... | |
| | #2 | | | $C_{2K+1}S_0$ | ... | | ... | $C_{(M-1)K+1}S_{(M-3)K}$ | | | | |
| | #L/K | | | | | $C_{L+1}S_0$ | ... | | | | | |
| CORRELATOR BLOCK ##1 | #0 | $C_1S_1$ | $C_{K+1}S_{K+1}$ | $C_{2K+1}S_{2K+1}$ | ... | | ... | $C_{(M-1)K+1}S_{(M-1)K+1}$ | | $C_{(M-1)K+1}S_{(M-1)K}$ | ... | $C_{L+(M-1)K+1}S_{(M-1)K+1}$ |
| | #1 | | $C_{K+1}S_1$ | $C_{2K+1}S_{K+1}$ | ... | | | | | | | |
| | #L/K | | | | | $C_{L+1}S_1$ | ... | | | | | |
| CORRELATOR BLOCK ##2 | #0 | $C_1S_2$ | $C_{K+1}S_{K+2}$ | $C_{2K+1}S_{2K+2}$ | | | | $C_{(M-1)K+1}S_{(M-1)K+2}$ | | | | |
| | #1 | | $C_{K+1}S_2$ | $C_{2K+1}S_{K+2}$ | | | | | | | | |
| | #L/K | | | | | $C_{L+1}S_2$ | | | | | | $C_{L+(M-1)K+1}S_{(M-1)K+2}$ |
| CORRELATOR BLOCK ##K-1 | #0 | $C_1S_{K-1}$ | $C_{K+1}S_{2K-1}$ | $C_{2K+1}S_{3K-1}$ | | | | $C_{(M-1)K+1}S_{MK-1}$ | $C_{MK+1}S_{MK-1}$ | | | |
| | #1 | | $C_{K+1}S_{K-1}$ | $C_{2K+1}S_{2K-1}$ | | | | | | | | |
| | #L/K | | | | | $C_{L+1}S_{K-1}$ | | | | | | $C_{L+(M-1)K+1}S_{MK-1}$ |

FIG. 7

| | | 1 | 2 | | K |
|---|---|---|---|---|---|
| CORRELATOR BLOCK #0 | CORRELATOR #0 | $D_0 U_0$ | $D_1 U_0$ | .... | $D_{K-1} U_0$ |
| | CORRELATOR #1 | $D_K U_0$ | $D_{K+1} U_0$ | .... | $D_{2K-1} U_0$ |
| | CORRELATOR #2 | $D_{2K} U_0$ | $D_{2K+1} U_0$ | .... | $D_{3K-1} U_0$ |
| | : | : | : | .... | : |
| | CORRELATOR #L/K | $D_L U_0$ | $D_{L+1} U_0$ | .... | $D_{L+K-1} U_1$ |
| CORRELATOR BLOCK #1 | CORRELATOR #0 | $D_{-1} U_1$ | $D_0 U_1$ | .... | $D_{K-2} U_1$ |
| | CORRELATOR #1 | $D_{K-1} U_1$ | $D_K U_1$ | .... | $D_{2K-2} U_1$ |
| | CORRELATOR #2 | $D_{2K-1} U_1$ | $D_{2K} U_1$ | .... | $D_{3K-2} U_1$ |
| | : | : | : | .... | : |
| | CORRELATOR #L/K | $D_{L-1} U_1$ | $D_L U_1$ | .... | $D_{L+K-2} U_0$ |
| CORRELATOR BLOCK #K-1 | CORRELATOR #0 | $D_{-(K-1)} U_{K-1}$ | $D_{-K+2} U_{K-1}$ | .... | $D_0 U_{K-1}$ |
| | CORRELATOR #1 | $D_1 U_{K-1}$ | $D_2 U_{K-1}$ | .... | $D_K U_{K-1}$ |
| | CORRELATOR #2 | $D_{K+1} U_{K-1}$ | $D_{K+2} U_{K-1}$ | .... | $D_{2K} U_{K-1}$ |
| | | | | .... | |
| | CORRELATOR #L/K | $D_{L-(K-1)} U_{K-1}$ | $D_{L-K+2} U_{K-1}$ | .... | $D_L U_{K-1}$ |

| | | 1 | 2 | ... | K |
|---|---|---|---|---|---|
| CORRELATOR BLOCK ##0 | CORRELATOR #0 | $D_0 U_0$ | $D_1 U_0$ | .... | $D_{K-1} U_0$ |
| | CORRELATOR #1 | $D_K U_0$ | $D_{K+1} U_0$ | .... | $D_{2K-1} U_0$ |
| | CORRELATOR #2 | $D_{2K} U_0$ | $D_{2K+1} U_0$ | .... | $D_{3K-1} U_0$ |
| | : | : | : | .... | : |
| | CORRELATOR #L/(n·K) | $D_{L/n} U_0$ | $D_{L/n+1} U_0$ | .... | $D_{L/n+K-1} U_0$ |
| CORRELATOR BLOCK ##1 | CORRELATOR #0 | $D_{-1} U_1$ | $D_0 U_1$ | .... | $D_{K-2} U_1$ |
| | CORRELATOR #1 | $D_{K-1} U_1$ | $D_K U_1$ | .... | $D_{2K-2} U_1$ |
| | CORRELATOR #2 | $D_{2K-1} U_1$ | $D_{2K} U_1$ | .... | $D_{3K-2} U_0$ |
| | : | : | : | : | : |
| | CORRELATOR #L/(n·K) | $D_{L/n-1} U_1$ | $D_{L/n} U_1$ | .... | $D_{L/n+K-2} U_0$ |
| ≈ | ≈ | : | : | : | .... ≈ : ≈ |
| CORRELATOR BLOCK ##K-1 | CORRELATOR #0 | $D_{-(K-1)} U_{K-1}$ | $D_{-K+2} U_{K-1}$ | .... | $D_0 U_{K-1}$ |
| | CORRELATOR #1 | $D_1 U_{K-1}$ | $D_2 U_{K-1}$ | .... | $D_K U_{K-1}$ |
| | CORRELATOR #2 | $D_{K+1} U_{K-1}$ | $D_{K+2} U_{K-1}$ | .... | $D_{2K} U_{K-1}$ |
| | | | | .... | |
| | CORRELATOR #L/(n·K) | $D_{L/n-(K-1)} U_{K-1}$ | $D_{L/n-K+2} U_{K-1}$ | .... | $D_{L/n} U_{K-1}$ |

FIXED PATTERN DETECTION APPARATUS

FIELD OF THE INVENTION

This invention relates to a correlator and, more particularly, to a correlator usable with advantage in detecting a fixed pattern in a reception device of the CDMA communication system.

BACKGROUND OF THE INVENTION

The spread spectrum communication system is such a one in which a transmitter modulates a transmission signal and spectrum-spreads the modulated transmission signal using a spread code (pseudorandom noise, herein abbreviated as "PN"), to transmit the spectrum-spread signal, and in which a receiver upon receiving and demodulating the spectrum-spread signal, transmitted from the transmitter, inverse-spreads (despreads) the received spectrum-spread signal, using the same PN sequence as that used for spreading in the transmitter. It is only when a PN sequence contained in the received signal coincides with that generated on the receiver side that correct demodulation is achieved.

Recently, the CDMA (Code Division Multiple Access) communication system, in which a PN sequence of the spread-spectrum system is allocated from one communication event to another, is felt to be promising as a standard for a mobile terminal equipment of a mobile communication system for the wireless (radio) communication system. In this CDMA communication system, the user information pieces, spectrum-spread by a PN specific to a user, are transmitted as they are superposed in the same frequency band, and, on the other hand, a receiver extracts the information using the PN specific to the user desiring to receive. This CDMA communication system has a number of merits, such as high spectrum utilization efficiency, invulnerability to multiple paths and high secrecy.

In the communication system of this CDMA system, the generating timing of the PN sequence contained in received signals and the generating timing of the PN sequence Provided on the receiving side are estimated with a precision within one chip, and the operation of a PN sequence generator is started at this timing, by way of synchronized capture (synchronization acquisition), in order to achieve timing synchronization with respect to the PN contained in the signal. Moreover, in the direct spread (DS) system, since a slightest deviation from the synchronization Position leads to failure in tracking (or tracing) of the received signal, synchronization tracking for monitoring to prohibit time shift of the PN sequence is used on the receiver side with respect to the received signal once acquired with success. To this end, a Preset fixed pattern is inserted as a synchronization signal by a transmitter into a transmission signal for transmission, whilst a receiver calculates a correlation value between the received signal and the fixed pattern by way of synchronization detection to detect received signals and/or to effectuate frame synchronization, for synchronization control.

In a correlator for synchronized capture by a receiver of the spread-spectrum communication, the received signal is multiplied with a PN sequence chip-by-chip and the results of multiplication are summed together to determine a correlation value. Since a high correlation value is obtained when a PN sequence of the received signal coincides with a PN sequence provided on the receiver side, correlation is sought as a PN sequence of the received signal is being shifted in phase from the PN se sequence of the receiver side. The position of a maximum correlation value or the position which has exceeded a Preset threshold correlation value is used as a position of synchronization to effectuate demodulation at a corresponding phase. Among the methods based on the Phase shifting, such a method is used in which the PN sequence generated on the receiver side is shifted as in a matched filter method or sliding correlation method.

The correlator by the matched filter includes shift registers, plural multipliers for multiplying outputs of respective stages of the shift registers with a PN and an adder for summing outputs of the plural multipliers. The spread-spectrum signal, which is a signal received e.g., over an antenna and subsequently converted into a base-band signal is sequentially stared chip-by-chip in the shift registers. The spread-spectrum signal stored in each stage of the shift registers is multiplied chip-by-chip with the PN in each multiplier and the multiplied results are transmitted to an adder to obtain a sum which is sent out as an output signal. If the PN sequence coincides in timing with the PN sequence of the received spread-spectrum signal, an output of the adder assumes a maximum value signal (matched pulse). So, the synchronization is detected from the matched pulse and, based on the results of synchronization detection, demodulation is performed by a demodulator. As for the synchronization detection circuit employing a carrelator by a matched filter, reference is had to the publication of the Japanese patent No. 2850959.

SUMMARY OF THE DISCLOSURE

Various problems have been encountered in the conventional art in the course of investigations toward the Present invention.

Meanwhile, in the CDMA communication system, the signal subjected to spread spectrum modulation, is of a broad band, with a Power spectral density of the signal becoming extremely low. Thus, the S/N (signal to noise) ratio at the front end of the receiver is extremely low. That is, the S/N ratio of an input signal, calculated as a chip rate, is extremely small, so that, in order to achieve correct timing synchronization, a fixed pattern of an exceedingly long length in terms of a chip as unit is required as a synchronization pattern. Thus, a correlator of a longer length is required as a synchronization-acquiring circuit on the receiver side. For example, if a fixed pattern of a code length N, comprised of a signal obtained on spreading a fixed word with a length of K symbols with a spreading factor of M chips per symbol, is input, the correlator for detecting the K-symbol fixed word in accordance with the correlation detection system would assume a length of M×K chips.

If, in a correlator employing shift registers, such as a matched filter, the correlator length is increased, the circuit scale of each of the shift register and the adder and hence the number of the multipliers are increased. The result is that the power consumption is increased to render it difficult to lower the Power consumption and production cost of the mobile terminal equipment, such as a Portable telephone of the CDMA system.

On the other hand, a correlator of the sliding system, such as one configured as shown for example in FIG. 12, is employed.

Referring to FIG. 12, an input signal and a spread coefficient Ci are multiplied with each other in a multiplier 201, and the multiplied results are sent to an input of an adder 202 and summed to directly predicting accumulation value (with an initial value being 0) fed to the other input of the adder 202. The summed result is latched by a latch circuit 203 and fed back to the other input of the adder 202 so as to be added to a next following multiplied result.

If, in the correlator of the sliding system, shown in FIG. 12, it is desired to take correlation of a length N, the result of N times of multiplication and summation of the resulting products is output as a correlation value, such that a Period of time required for acquisition of the correlation value is increased in proportion to the length N, whilst the time required for synchronization capture is also increased.

If, in the wireless mobile communication system, reduction in power consumption and cost is to be achieved to meet the general demand, it is necessary to diminish the circuit configuration of the correlator and the hardware scale, while it is also necessary to speed up the correlator operation.

As a correlator with a reduced circuit scale, there is proposed in our earlier patent application (JP Patent Application 11-265040, nor laid-open at the time of filing of the present Japanese application, now JP-A- 2001-094468) such a correlator designed to take correlation using, as input, a fixed pattern of a code length N, comprised of a signal obtained on spreading a fixed word of a length of K symbols with a spreading factor of M chips per symbol, in which the correlator is made up of first-stage correlators with a length of M chips and second-stage correlators with a length of K, configured to take correlation with the fixed word of K symbols from an output of the first stage correlators. In the JP Patent Application 11-265040, each symbol of a fixed word, comprised of K symbols ($U_0$, $U_1$, $U_2$, . . . , $U_{K-1}$) is each of an M chip period. Each symbol spread by a M-chip PN (see FIG. 13 (a)) is transmitted as a fixed pattern $C'_n$, where $0 \leq n \leq N-1$. The receiver detects the fixed word ($U_0$, $U_1$, $U_2$, . . . , $U_{K-1}$ with the first stage correlator and the second stage correlator.

Recently, a proposal has been made of a system in which a base station detects a fixed pattern from a signal obtained on re-arraying (scrambling) at a chip rate from a control channel from a mobile station to recognize the presence of the mobile station where it is intended to start the call etc. For examples a signature Pattern with a length of K chips ($U_0$, $U_1$, $U_2$, . . . , $U_{K-1}$) is repeated M times for the code length N (N chip periods) (N=K ×M), with the period of each $U_i$, where $0 \leq i \leq K-1$, is a one chip period. The original one symbol corresponds to a combination of M chips. That is, the respective symbols are spread with the PN at a rate of M per symbol, the K symbols spread by the PN are split with the chip period as a unit, to give a scrambled pattern corresponding to the signature pattern. Meanwhile, FIG. 4 will be subsequently referred to in the explanation of the Examples.

It is known that, in the configuration of splitting K symbols of the fixed word of FIG. 13 (b) into M chips each, re-arraying (scrambling) the symbols per the chip Period and transmitting a signature pattern (fixed pattern) shown in FIG. 4(b), the following merits are derived.

First, in a fading environment, especially if the Doppler frequency is large, it is unnecessary to adopt a delay detection system aimed at prohibiting mistaken detection, thus simplifying the receiver configuration.

Second, such an occurrence can be suppressed or improved in which, if there is a large frequency offset between the transmitting and receiving sides, large correlation values may be detected at an incorrect timing (at a non-synchronized timing)

As for this signature pattern, reference is made to the description in "4.3. 3.2 Preamble Signature" in "TS 25. 213 V2. 3.0 (1999-9)" which is a document by e.g., 3GPP "Third Generation Partnership Project (3GPP); Technical Specification Group (TSG); Radio Access Network (RAN); Working Group 1 (WG1); Spreading and Modulation (FDD))". The entire disclosure thereof being incorporated herein by reference thereto.

In the aforementioned JP Patent Application 11-265040, exclusively the fixed pattern shown in FIG. 13(c) is input to detect a fixed word, while account is not taken of the configuration in which the fixed pattern is detected from a signal obtained on re-arraying the fixed word symbol at a chip rate.

It is therefore a principal object according to an aspect of the present invention to provide a fixed pattern detection device in the CDMA communication system in which, in detecting a fixed pattern from a received signal, in which the fixed pattern is re-arrayed and inserted at a chip rate, the time consumed in detection is to be shortened, and a CDMA receiving apparatus having such fixed pattern detection device.

It is another object according to another aspect of the present invention to provide a fixed pattern detection device, in which the circuit scale may be reduced, and a CDMA reception apparatus having such fixed Pattern detection device. Other aspects, objects, features and advantages of the present invention will become readily apparent from the following description to those skilled in the art.

According to an aspect of the present invention, there is provided a device for detecting a fixed pattern, fed as a received signal with a pattern of a length of N chips, the received signal being obtained on dividing and re-arraying each of K symbols in terms of a chip period as a unit, K being a preset positive integer, each of the symbols being spread with a spread code at a rate of M chips per symbol, U being a preset positive integer, and on repeatedly inserting into the re-arrayed symbols a signature pattern of a length K, having one chip period as a unit, by M times, where N=K×M, the signature Pattern being detected from the received signal.

The device includes first-stage correlators taking correlation between M received signals spaced apart from one another by every K chips, and M spread code sequences obtained on jumping a spread code sequence of a length N by every Kth chip to output correlation values associated with K signatures, respectively; and second-stage correlators taking correlation between the correlation values associated with K signatures output by the first-stage correlators and a pre-defined signature pattern. The spread code sequences are generally termed as pseudorandom noise (PN). The term "spread" used herein relates to spectrum-spread.

According to another aspect of the present invention, the correlators are arranged in blocks and each of the K correlator blocks is made up of a plurality of (R+1) correlators of a length M arranged in parallel with one another.

In each of the correlator blocks, the first correlator of the (R+1) correlators is fed with M received signals at every K chips and the spread code sequence to take correlation of a length M, the second correlator is fed with M received signals, at every K chips, having the received signal as supplied to the correlator as second data, as leading end data, and with a spread code sequence which is the spread code sequence supplied to the first correlator delayed by a delay element in synchronism with an operating period, to take correlation with a length equal to M, and so on, such that the (R+1)st correlator is fed with M received signals at every K chips, having the received signal supplied to the correlator as second data, as leading end data, and with a spread code sequence which is the spread code sequence supplied to the first correlator and delayed by R delay elements in synchronism with an operating period, to take correlation with a length equal to M.

BRIEF DESCRIPTION OF THE DRAWINGS

FIG. 5 is a schematic view for illustrating the operation of the embodiment of the present invention.

FIG. 6 is a schematic view for illustrating the operation of the embodiment of the present invention.

FIG. 7 is a schematic view for illustrating the operation of the embodiment of the present invention.

FIG. 10 is a schematic view for illustrating the operation of a second embodiment of the present invention.

FIG. 11 is a schematic view for illustrating the operation of the second embodiment of the present invention.

PREFERRED EMBODIMENTS OF THE INVENTION

Figure 1:
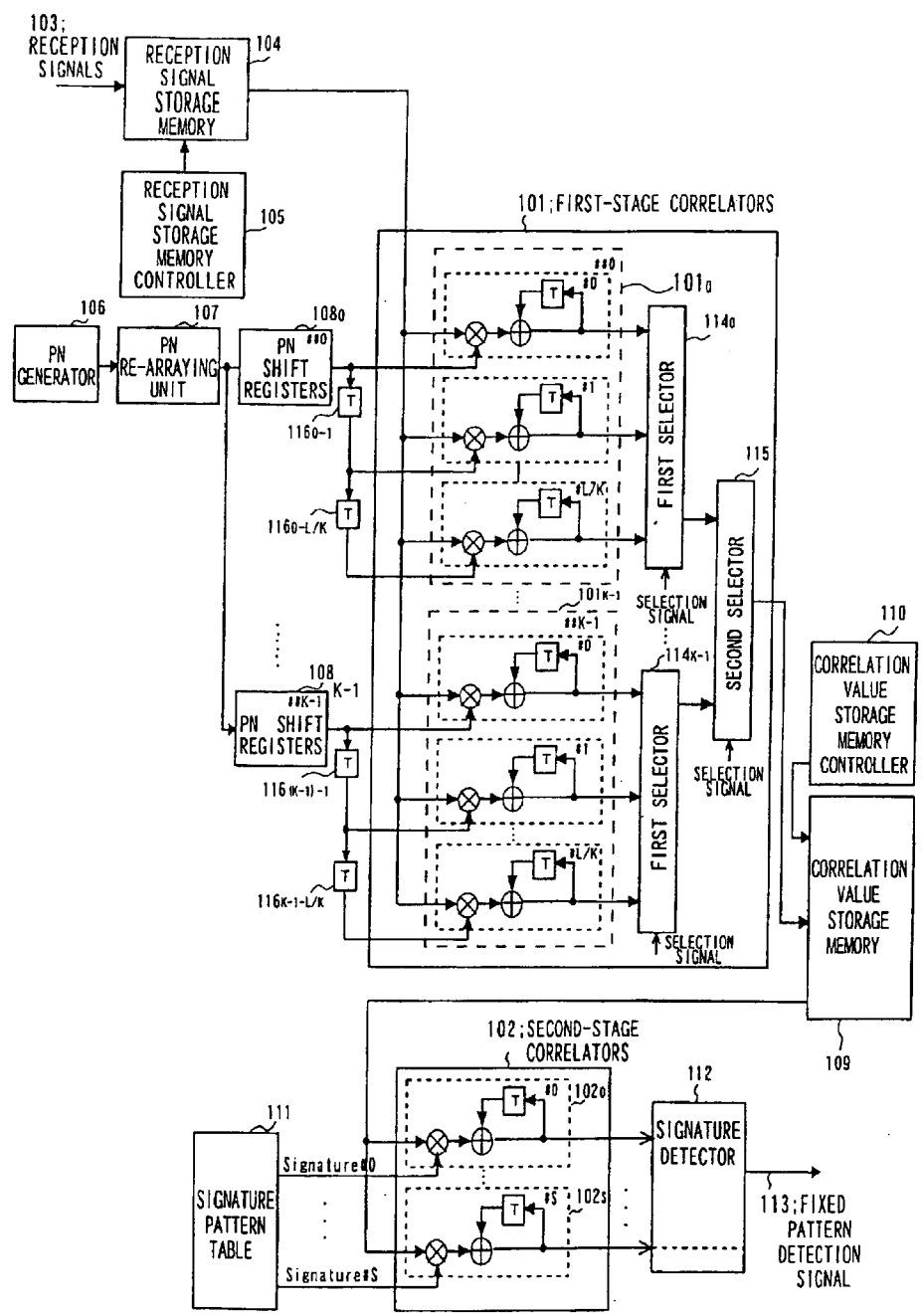
FIG. 1 is a block diagram showing a configuration of an embodiment of the present invention.

An embodiment of the present invention will now be explained, in which, according to the present invention, a correlator system for detecting a fixed pattern in a device for receiving a signal having a signature pattern of a preset length inserted therein at a chip rate is made up of two-stage correlators.

In an preferred embodiment of the present invention, there is provided a device for detecting a fixed pattern (signature pattern), fed with a pattern of a length of N chips, as a received signal, the received signal being obtained on dividing and re-arraying each of a plurality of or K symbols in terms of a chip period as a unit, each symbol being spread with the spread code (pseudorandom noise PN) at a rate of M chips per symbol, and on repeatedly inserting into the re-arrayed symbols a signature pattern ($U_0$, $U_1$, $U_2$, . . . , $U_{K-1}$) of a length K having one chip period as a unit, by M times, where N=K×M, the signature pattern being detected from the received signal. The device includes K PN shift registers ($108_0$, $108_1$, $108_{K-1}$) for storing and holding the K PN sequences {$S_0$, $S_K$, $S_{(M-1)K}$}, {$S_1$, $S_{K+1}$, $S_{(M-1)K+1}$}, . . . {$S_{K-1}$, $S_{2K-1}$, $S_{N-1}$} output by a PN re-arraying unit (107) adapted for decimating (partially cancelling) and re-arraying the PN sequence ($S_0$ to $S_{N-1}$) of a length N generated by the PN generator (106), a first stage correlator unit (101) made up of K correlator blocks $101_0$, $101_1$, . . . , $101_{K-1}$ arranged parallel to one another, and fed with M received signals obtained on reading out the received signals stored in a storage device (104) at every K chips and with the PN sequence of a length M from the PN shift registers ($108_0$, $108_1$, . . . , $108_{K-1}$) to output correlation values output from the first-stage correlator unit (101), and a second stage correlator unit (102) for taking correlation with a signature of a length K based on the correlation values output from the first stage correlator unit (101).

In a preferred embodiment of the present invention, for calculating correlation values shifted chip by chip for N+L chips, where L, which is an integer divisible by K, denotes an indefinite time range during which there exists the signature pattern, with N (=K×M)+L chips, there are provided in each of K correlator blocks ($101_0$ to $101_{K-1}$) in-parallel-arrayed (i.e., juxtaposed) L/K+1 correlators, each of a length M, the first correlator (#0) of the L/K+1 correlators is fed with M received signals read from a memory device (104) at every K chips (at every K−1 chips) and the PN sequence shift-output from the PN shift register (108) to take correlation of a length M, the second correlator is fed with M received signals, at every K chips, having the received signal supplied to the correlator as second data, as leading end data, and with M PN sequences each of which is the PN sequence supplied to the first correlator delayed by a delay element (116) in synchronism with an operating period, to take correlation with a length equal to M; and so on; such that the (L/K+1) st correlator is fed with M received signals at every K chips, having the received signal supplied to the L/Kth correlator as second data, as leading end data, and with a PN sequence, which is the PN sequence supplied to the first correlator and delayed by L/K delay elements, such as $116_{0-1}$ to $116_{0-L/K}$, in synchronism with an operating period, to take correlation with a length equal to M. Each delay element is used for synchronizing the received signals and the PN sequence supplied from the PN shift register, to input the synchronized received signals and the PN sequence of each correlator.

In an embodiment of the present invention, the correlation values are calculated in a first correlator of a shorter length than the fixed pattern length N, and the ultimate correlation values are calculated in the second correlator to shorten the processing time for calculating the correlation values. That is, in the preferred embodiment of the present invention, plural blocks of the first stage correlators are provided in parallel so that the calculation of the correlation values is carried out in parallel with respect to sole readout of the received signals from the storage device to shorten the processing time.

In another preferred embodiment of the present invention, each of the K correlator blocks is made up of a plurality of (R+1) correlators of a length M arranged in parallel with one another, the first correlator of the (R+1) correlators is fed in each correlator blocks with M received signals at every K chips and the PN sequence to take correlation of a length M, the second correlator is fed with M received signals, at every K chips, having the received signal supplied to the correlator as second data, as leading end data, and with a PN sequence which is the PN sequence supplied to the first correlator delayed by a delay element in synchronism with an operating period, to take correlation with a length equal to M; and so on; such that the (R+1) st correlator is fed with M received signals at every K chips, having the received signal supplied to the correlator as second data, as leading end data, and with a PN sequence which is the PN sequence supplied to the first correlator and delayed by R delay elements in synchronism with an operating period, to take correlation with a length equal to M. If, in the received signal, the indefinite time range in which exists the signature pattern is L chips, and the correlation values shifted chip by chip are calculated for the N+L chips, the processing of calculating correlation values for the K correlator blocks for each section obtained on dividing the L to obtain the correlation value for the N+L chip length. In this manner, in a case where each correlator block is made up of a preset number of correlators, it is made possible to detect the fixed pattern for optional L which is an integer divisible by K.

In the present embodiment, each correlator block is provided with L/(n×K)+1 correlators arranged in parallel, where n is a Preset integer which will render L/(n×K) an integer, to reduce the circuit scale.

DETAILED DESCRIPTION OF THE PREFERRED EMBODIMENT

For more detailed explanation of the embodiments of the present invention, certain preferred embodiments of the present invention will be explained by referring to the drawings, in which FIG. 1 shows a structure of an embodiment of the present invention as applied to a CDMA reception apparatus. Referring to FIG. 1, the configuration of the preferred embodiment is now explained.

Referring to FIG. 1, a fixed pattern detector according to a preferred embodiment of the present invention includes a received signal storage memory 104 for transiently storing a spread-spectrum signal (received signal) 103, received over an antenna, not shown, converted into baseband signals and subsequently sampled, a received signal storage memory controller 105, for controlling reading-out of the received signal storage memory 104 and a first-stage correlators (unit) 101 made up of K correlator blocks ##0 to ##K−1, each being M chips long. The fixed pattern detector also includes a spread code (PN) generator 106 for generating and outputting the PN, a PN re-arraying unit 107 for jumping at every Kth chips (i.e., decimating intermediary chips to every Kth chip) the PN generated in the PN generator 106 to re-array the PN for distribution into K groups, and K PN shift registers $108_0$ to $108_{K-1}$ for storing and shifting the PN distributed from the PN re-arraying unit 107 to output the shifted PN. The fixed pattern detector also includes a first set of selectors 114 and a second selector 115, a correlation value storage memory 109 for storing correlation values output from the first-stage correlators 101 through the first set of selectors $114_0$ to $114_{K-1}$ and the second selector 115 and a correlation value storage memory controller 110 for controlling the writing of the correlation values output from the first-stage correlators 101 into the correlation value storage memory 109 and for controlling reading-out of the correlation values from the correlation value storage memory 109. The fixed Pattern detector also includes a signature pattern table 111 for storing and holding the signature pattern, a second-stage correlator 102 for taking correlation between the signature of the signature pattern table 111, with a length of K, and the K correlation values read out from the correlation value storage memory 109, and a signature detector 112 fed with the correlation values output by the second-stage correlators (unit) 102 to output a fixed pattern detection signal 113.

In a preferred embodiment of the present invention, K correlator blocks (##0) $101_0$ to (##$K_{-1}$ of the first-stage correlators 101 are each provided with L/K+1 correlators #0 to #L/K. For the received signal, there is an indefinite time width (range) as a predicted reception time (or timing). This indefinite time width is depicted in terms of a chip, with L being an integer divisible by K.

Figure 2:
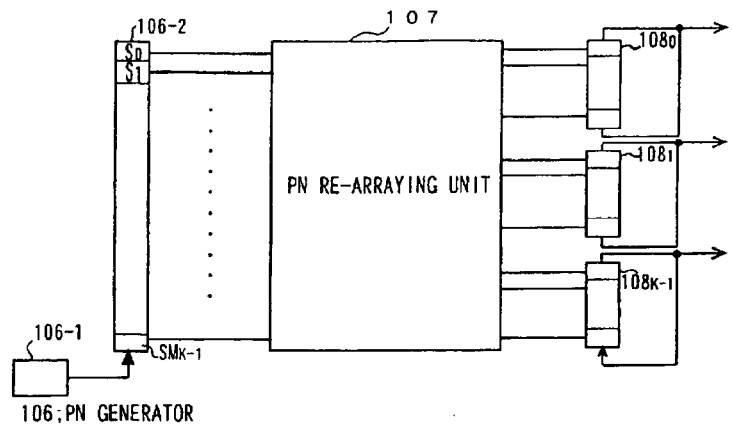
FIG. 2 is a block diagram showing a configuration of a spread code re-arraying unit according to an embodiment of the present invention.

FIG. 2 shows the structure of the PN re-arraying unit 107 in a preferred embodiment of the present invention. Refer-ring to FIG. 2, the PN sequence of a length N, that is $S_0$ to $S_{N-1}$, where N=K ×M, generated in the PN generating section 106-1 of the PN generator 106, is once stored in a shift register 106-2 of a length N, in the order it is generated. The N PNs are output in parallel from the shift register 106-2 and input to the PN re-arraying unit 107 where it is distributed and stored in the PN shift registers $108_0$ to $108_{K-1}$.

The PN re-arraying unit 107 is arranged e.g., as a matrix switch for re-arraying the PN in a desired manner by changing over the combination of connection between the input and output by program control. That is, the PN re-arraying unit 107 is designed to re-array the PNs, generated in the PN generating section 106-1, variably depending on the re-arrayed, that is scrambled, state of the signature pattern ($U_0$, $U_1$, $U_2$, . . . , $U_{K-1}$) for distribution to the aforementioned PN shift registers $108_0$ to $108_{K-1}$.

Figure 3:
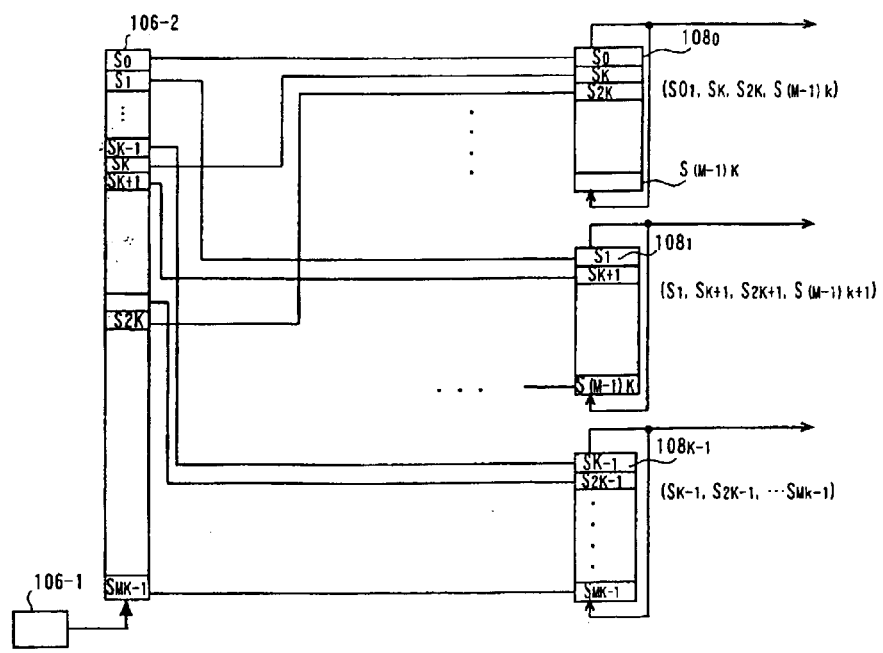
FIG. 3 is a block diagram showing a configuration of a spread code re-arraying unit according to an embodiment of the present invention.

FIG. 3 shows a typical connecting state of the input and the output of the PN re-arraying unit 107. Referring to FIG. 3, the shift register 106-1 is decimated at a rate of one for K (chips), and connection is made so that the PNs $S_0$, $S_K$, . . . , $S_{K(M-1)}$ are set for M registers of the PN shift register $108_0$, PNs $S_1$, $S_{K+1}$, . . . $S_{K(M-1)+1}$ are set for M registers of the PN shift register $108_1$, and PNs $S_{K-1}$, $S_{2K-1}$, . . . , $S_{KM-1}$ are set for M registers of the PN shift register $108_{K-1}$. Meanwhile, the PN re-arraying unit 107 may be configured as a wiring interconnecting the shift register 106-1 and the PN shift registers $108_0$ to $108_{K-1}$, as shown in FIG. 3. In this case, re-arraying can be changed by changing the wiring structure.

The PN shift registers $108_0$ to $108_{K-1}$ is of a cyclic (logs) shifting structure which, in operation, the PN output from the shift output is again fed to an input. At a time point the M th PN has been shift-output, the original PN has made a round and is stored in the original form in the PN shift register.

If a different PN is used in the receiver, a different PN is generated in the PN generator 106 and a PN is stored through the PN re-arraying unit 107 in the PN shift registers $108_0$ to $108_{K-1}$.

An output of the (L/K+1) correlator outputs of the first-stage correlators blocks $101_0$ to $101_{K-1}$ is selectively output via first selectors $114_0$ to $114_{K-1}$. The outputs of the first selectors $114_0$ to $114_{K-1}$ are input to the second selector 115 where one of the outputs is selectively output to the correlation value storage memory 109. A selection signal for controlling the selection of the first selector 114 or the second selector 115 is output in synchronism with the writing into the correlation value storage memory 109 by a controller, not shown.

The second-stage correlator 102 calculates the correlation values between the K correlation values output from the first-stage correlators 101 with K signatures.

The signature detector 112 detects a maximum value of the correlation values output by the second-stage correlators (unit) 102 from signature to signature and compares the maximum value so detected to a preset signature detection threshold value to verify whether or not there is each signature pattern in the received signal. If there is the signature pattern, the detected correlation values and the delay information are output as a fixed pattern detection signal 113. If, in a multi-path environment, plural paths are detected, the fixed pattern detection signal 113 is output for plural delay quantities for one signature.

Figure 9:
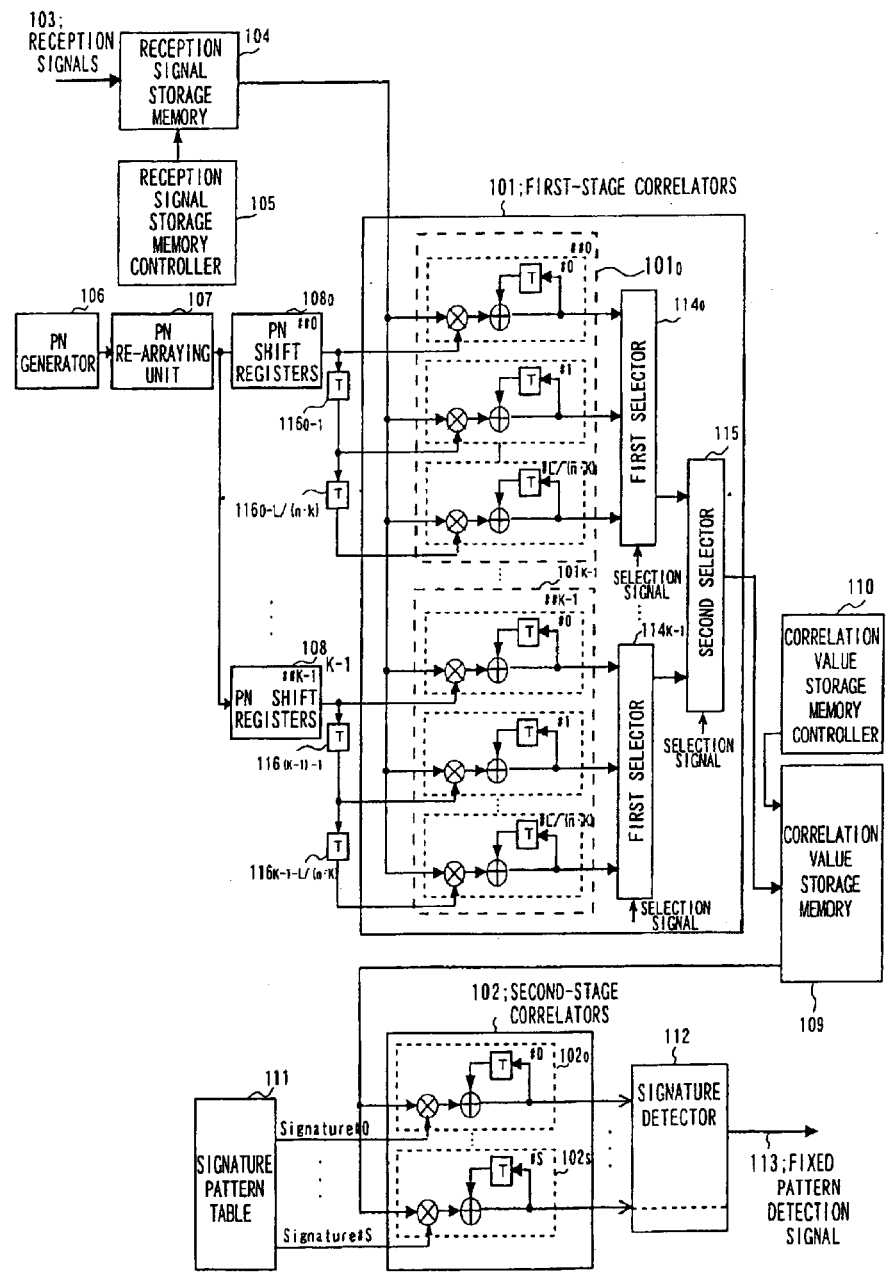
FIG. 9 shows a configuration of a second embodiment of the present invention.
Figure 12:
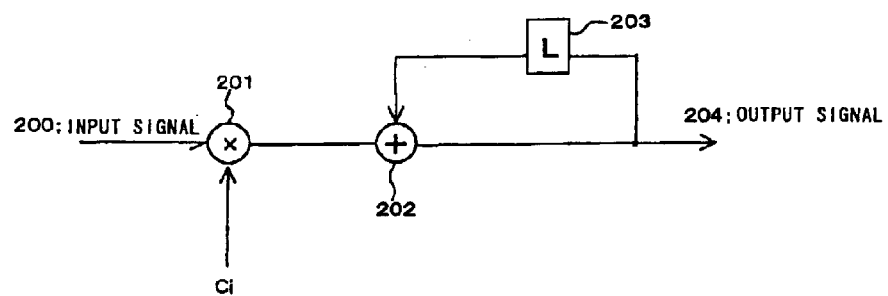
FIG. 12 shows an illustrative structure of a correlator.
Figure 13:
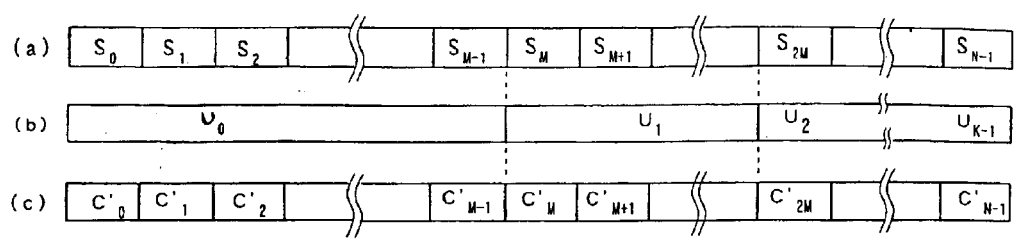
FIGS. 13(a), (b) and (c) are schematic views for illustrating the transmission signal generated on spreading a fixed word by the spread code.

For the correlators #0 to #L/K of the first-stage correlators blocks $101_0$ to $101_{K-1}$ and for the correlators $102_0$ to $102_s$ of the second-stage correlators (unit) 102, those configured as shown in FIG. 9 are used.

The operation of a preferred embodiment of the present invention is now explained. The received signal is the fixed pattern $C_n$, n being an integer such that $0 \leq n \leq N-1$, and a noise appended thereto. The fixed pattern $C_n$, n being an integer such that $0 \leq n \leq N-1$, is a signal obtained on spreading a fixed word of a length K by the PN at a rate of M chips per symbol, dividing the spread signals into M chips and re-arraying (scrambling) the M chips to give a pattern comprising M times repetitions of signature patterns of a length K based on a one-chip period as a unit (N=K×M).

Figure 4:
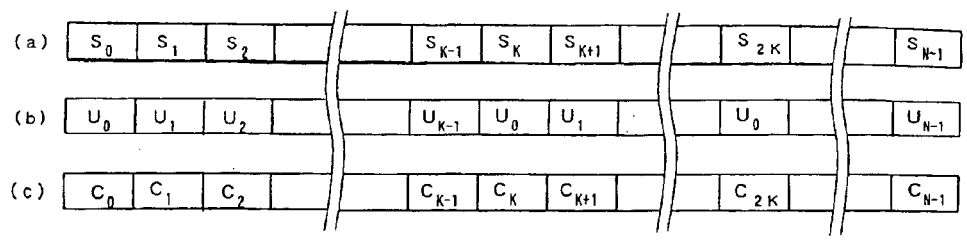
FIGS. 4(a), (b) and (c) are schematic views for illustrating the operation of the embodiment of the present invention.

Each signature is inserted, being divided into the chip rate through decimation. For example, a signature pattern ($U_0$, $U_1$, $U_2$, ..., $U_{K-1}$) is repeated M times for a code length N (N chips), as shown for example in FIG. 4. Each $U_1$ is a chip period. M chips at every K chips, combined together, correspond to a symbol.

FIG. 4a shows a PN $S_n$ of a length N, where $0 \leq n \leq N-1$. FIG. 4b shows a re-arrayed, that is scrambled, signature pattern $U_k$, where $0 \leq k \leq K-1$. The fixed pattern $C_n$ is transmitted from the transmitting side, with the receiver being fed with a fixed pattern $C_n$ of the length N as received signal, where $0 \leq n \leq N-1$.

If the PN of the length N is $S_n$, where n=mK+k, $0 \leq k \leq K-1$, $0 \leq m \leq M-1$, K×M=N, and the signature pattern Uk is one with a length K, where $0 \leq k \leq K-1$, the fixed pattern Cn with a length N, where n=mK+k, $0 \leq k \leq K-1$, $0 \leq m \leq M-1$, K×M=N, is given by the following equation (1);

$$C\ mK+k = Uk \times S\ mK+k \qquad (1)$$

where $0 \leq k \leq K-1$, $0 \leq m \leq M-1$.

For the so-spread fixed pattern Cn, correlation values are computed, in a preferred embodiment of the present invention, using two-stage correlators (units) 101, 102, to detect a fixed pattern.

The first-stage correlators 101 calculate the correlation values between the received signal and the PN for a length of M chips.

Since there is an indefinite time width, corresponding to L-chip Periods, as the estimated reception time of the received signal, and there is a need for re-arraying (scrambling), the received signal corresponding to a code length N+L (indefinite time width) of the fixed Pattern is stored in the received signal storage memory 104.

In the first-stage correlators 101, the correlation values corresponding to a sum of M+L/K)×K=M×K+L=N+L chips, de-Phased from chip to chip, are calculated.

M received signals, stored in the received signal storage memory 104, are read at every K chips, and fed to the correlator blocks $101_0$ to $101_{K-1}$. The received signal storage memory controller 105 generates a readout address for the received signal storage memory 104 so that the received signal stored in the received signal storage memory 104 will be read out at every K chips.

The received signal read out from the received signal storage memory 104 and the PN sequence output on shifting the PN shift registers $108_0$ to $108_{K-1}$ in synchronism with the readout period of the received signals are input to the K correlator blocks $101_0$, to $101_{K-1}$ of the first-stage correlators 101 to calculate the correlation values of the signature corresponding to M chips of the symbol length. The correlation values so calculated are transiently stored in the correlation value storage memory 109.

Referring to FIG. 5, the operation of the first-stage correlators blocks in a preferred embodiment of the present invention is explained in further detail. FIG. 5 shows the list of readout of the received signal sequence $C_0$, $C_K$, $C_{2K}$, ... and input signal pairs to the multipliers in the correlators #0 to #L/K of the respective correlator blocks (##0 to ##$_{K-1}$) $101_0$ to $101_{K-1}$, with the abscissa in FIG. 5 indicating the operating time for M+L/K.

The received signals, stored in the received signal storage memory 104, are sequentially read out from the leading end, at every K chips ($C_0$, $C_K$, $C_{2K}$, ...), so as to be routed to the correlator blocks $101_0$ to $101_{K-1}$.

During the 0th operating period, leading data $C_0$ at the detection start position of the received signals are routed to the totality of the correlator blocks $101_0$ to $101_{K-1}$. The correlator blocks $101_0$, $101_1$, ..., $101_{K-1}$ are fed respectively with leading PNs $S_0$, $S_1$, ... $S_{K-1}$ from the PN shift registers $108_0$, $108_1$, ... $108_{K-1}$. The correlator #0 of the correlator blocks $101_0$, for example, multiplies the received signal $C_0$, as leading data read out from the received signal storage memory 104, with the leading PN $S_0$ of the PN shift register $108_0$ ($C_0 \cdot S_0$).

During the 0th operating period, the correlators #1 to #L/K of the correlator block $101_0$ are not in operation. In the correlator #0 of the correlator block $101_1$, the received signal $C_0$ is multiplied with the leading PN $S_1$ of the PN shift register $108_1$. This indicates a phase lead of one chip relative to the fixed pattern detection start position, as shown schematically in FIG. 8(b). In this 0th clock period, the correlator 1 of the correlator block $101_1$ is not in operation.

During the next first operating period, the Kth chip reception data $C_K$, as from the detection start position for the received signal, is read out from the received signal storage memory 104 so as to be routed to the correlator blocks $101_0$ to $101_{K-1}$ in their entirety. The correlator blocks $101_0$ to $101_{K-1}$ are fed with the second PNs SK, $S_k$, $S_{K+1}$, ..., $S_{2K-1}$ of the PN shift registers $108_0$, $108_1$, ... $108_{K-1}$.

During the first operating period, the correlator #0 of the correlator block $101_0$, for example, multiplies the received signal $C_K$ with the second PN $S_K$ from the PN shift register $108_0$ ($C_K \cdot S_K$). The result of multiplication is summed in an adder to the previously acquired $C_0 \cdot S_0$.

The correlator #1 of the correlator block $101_0$ is fed with the leading PN $S_0$, which is the output of the PN shift register $108_0$ delayed by a delay element (T) $116_{0-1}$, having a delay time corresponding to one operating Period. This leading PN $S_0$ is multiplied with the received signal $C_K$ supplied as second data to the correlator #0.

In the correlator #0 of, for example, the correlator block $101_1$, the received signal $C_K$ is multiplied with the second PN $S_{K+1}$ of the PN shift register $108_1$ ($C_K \cdot S_{K+1}$). This product is summed by an adder to the previous $C_0 \cdot S_1$.

During the first operating period, the correlator #1 of the correlator block $101_1$, the leading PN $S_1$ is fed through the delay element T to take correlation thereof with the received signal $C_K$. The result is sent as the second data to the correlator #0.

During the second operating period, $C_{2K}$, as the reception data separated by 2K chips from the detection start position of the received signal, is read out as third data from the received signal storage memory 104 and routed to each of the correlator blocks $101_0$ to $101_{K-1}$. The correlator blocks $101_0$, $101_1$, ..., $101_{K-1}$ are fed with third Pn s $S_{2K}$, $S_{2K+1}$, ..., $S_{3K-1}$ of the PN shift registers 108, 108, ... $108_{K-1}$.

During the second operating period, the correlator #0 of, for example, the correlator block $101_0$, multiplies the received signal $C_{2K}$ with the PN $S_{2K}$ from the PN shift register $108_0$, ($C_{2K} \cdot S_{2K}$) and the resulting product is summed to the result of the previous Product-sum operation $C_0 \cdot S_0 + C_K \cdot S_K$ by an adder.

During the second operating period, the correlator #1 of the correlator block $101_0$ is fed with a PN next to the leading one (second PN) through the delay element (T) $116_{1-0}$ which is multiplied with $C_{2K}$ in a multiplier.

The correlator #2 of the correlator block $101_0$ is fed with the leading PN $S_0$, delayed by the two-stage delay element (T). The delayed leading PN $S_0$ is multiplied with the read-out received signal $C_{2K}$.

During the (M-1) st Period, the reception data $C_{(M-1)K}$, which is the reception data corresponding to (M-1) Kst chip as from the detection start position of the received signal, is read out from the received signal storage memory 104 and supplied to the correlator blocks $101_0, 101_1, \ldots, 101_{K-1}$ in their entirety. These correlator blocks $101_0, 101_1, \ldots, 101_{K-1}$ are fed with the (M-1) st PN $S_{(M-1)K}, S_{(M-1)+1}, \ldots, S_{M3-1}$ of the PN shift registers $108_0, 108_1, \ldots 108_{K-1}$. The correlator #0 of, for example, the correlator block $101_0$, multiples the received signal $C_{(M-1)K}$ with the PN $S_{(M-1)K}$ from the PN shift register $108_0$ ($C_{(M-1)K} \cdot S_{M-1)K}$) and the resulting product is summed to the result of the previous product-sum by an adder.

During the (M-1) st period, the correlation values from the correlators #0 of the respective correlator blocks are output and, during the next Mth period, correlation values from the correlators #1 of the respective correlator blocks are output.

During the L/Kst period, the reception data of the (L/K) × K th chip (Lth chip) is fed to the correlator blocks $101_0$, $101_1, \ldots, 101_{K-1}$ in their entirety. The correlators $\#L/_{K+1}$ of the correlator blocks $101_0, 101_1, \ldots, 101_{K-1}$ are fed from the PN shift registers $108_0, 108_1, \ldots 108_{K-1}$ with PNs $S_0$ to $S_{K-1}$. FIG. 5 shows an embodiment in which the L/Kth period is ahead of the Mth period, however, if, when N=4096, M=256 and K=16, L=4096, then L/K=256, so that the L/Kth period is equal to the Mth period.

Figure 8A:
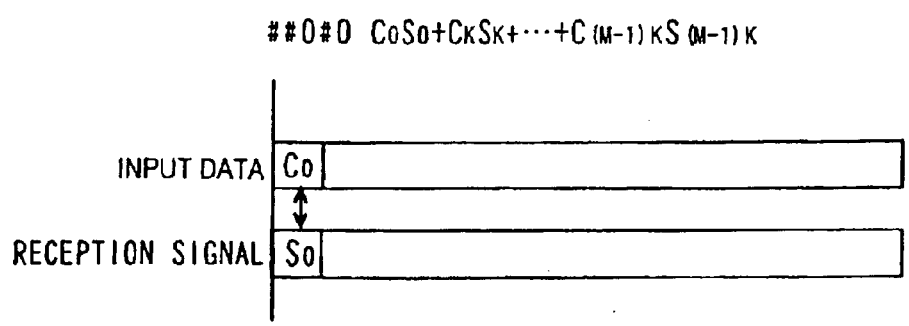
FIGS. 8(a) and (b) are schematic views for illustrating the operation of the embodiment of the present invention.

As described above, the correlation value from the correlator #0 of the correlator blocks $101_0$ is output during the (M-1)st period and is equal to $C_0 S_0 + C_K S_K + \ldots + C_{(M-1)K} S_{(M-1)K}$ and hence is equivalent to the correlation value of the 0th signature of the 0th chip (FIG. 8a). This is expressed as $D_0 U_0$ using $D_0$ indicating zero delay and the signature $U_0$.

An output of the correlation value from the correlator #1 of the correlator blocks $101_0$ is obtained during the Mth period an is equal to $C_K S_0 + C_{2K} S_K + \ldots + C_{(M-1)K} S_{(M-2)K} + C_{MK} S_{(M-1)K}$ which corresponds to the correlation value of the 0th signature of the Kth chip. This is expressed as $D_K U_0$, using $D_K$ indicating K delay and the signature $U_0$.

A correlation value output of the correlator #L/K of the correlator block $101_0$ is obtained during the (M+L/K-1) st period and is equal to $C_L S_0 + C_{L+K} S_K + \ldots + C_{L+(M-1)K} S_{(K-1)K}$. It is equivalent to the correlation value of the 0th signature ($U_0$) of the Lth chip ($D_L U_0$; delay L and signature $U_0$).

Figure 8B:
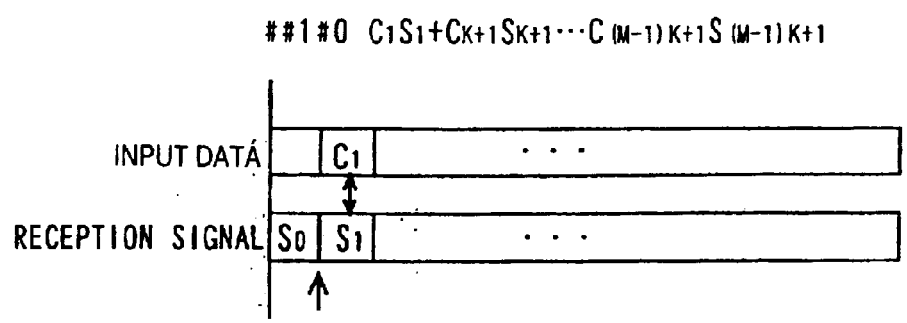

An output of the correlator #0 of the correlator block $101_1$ is obtained during the Mth period and is $C_0 S_1 + C_K S_{K+1} + \ldots + C_{(M-1)K} S_{(M-1)K+1}$, so that it is equivalent to the correlation value of the first signature of the delay -1 chip ($D_{-1} U_1$; delay -1, signature $U_1$) (see FIG. 8b).

An output of the correlator #0 of the correlator block $101_{K-1}$ is $C_0 S_{K-1} + C_K S_{2K-1} + \ldots + C_{(M-1)K} S_{MK-1}$ and is equivalent to the correlation value of the (K-1) st signature of the (-K+1) st chip previous to the received signal detection start position ($D_{-(K-1)} U_{K-1}$; delay-(K-1), signature $U_{K-1}$), whilst an output of the correlator #1 of the correlator block $101_{K-1}$ is equivalent to the correlation value of the (K-1) st signature of the first chip ($D_1 U_{K-1}$; delay 1, signature $U_{K-1}$), and an output of the correlator #L/K of the correlator block $101_{K-1}$ is equivalent to the correlation value of the (K-1) ST signature of the (L-K+1) st chip ($D_{L-(K-1)} U_{K-1}$; delay L-(K-1), signature $U_{K-1}$).

As for the second operation, readout is made every K chips from the received signal $C_1$ off set one chip relative to the first readout data $C_0$ from the received signal storage memory 104 and correlation with respect to the PN sequence is calculated in each correlator block. FIG. 6 shows input signals to the correlators of correlator blocks (##0 to K##K-1) $101_0$ to $101_{K-1}$ of the second operation.

During the 0th operating period, first data $C_1$ as from the received signal detection start position is sent to the correlator blocks $101_0, 101_1, \ldots, 101_{K-1}$ in their entirety. The correlator blocks $101_0, 101_1, \ldots, 101_{K-1}$ are fed with leading PNs $S_0, S_1, \ldots S_{K-1}$ from the PN shift registers $108_0$, $108_1, \ldots 108_{K-1}$.

For example, in the correlator #0 of the correlator block $101_0$, the received signal $C_1$ and the leading PN $S_0$ of the PN shift register $108_0$ are input to a multiplier to execute the multiplication $C_1 \cdot S_0$. This indicates that the phase is delayed one chip with respect to the fixed pattern detection start position. During the 0th operating period, the correlators #1 to #L/K of the correlator block $101_0$ are not in operation.

In the correlator #0 of the correlator block $101_1$, the received signal $C_1$ is multiplied with the leading PN $S_1$ of the PN shift register $108_1$.

During the first operating period, the (K+1) st reception data $C_{K+1}$ as from the received signal detection start position is supplied to the correlator blocks $101_0, 101_1, \ldots, 101_{K-1}$ in their entirety. These correlator blocks $101_0, 101_1, \ldots, 101_{K-1}$ are fed with the second PNs $S_K, S_{K+1}, \ldots, S_{2K-1}$ of the PN shift registers $108_0, 108_1, \ldots 108_{K-1}$.

In the correlator #0 of, for example, the correlator block $101_0$, the received signal $C_{K+1}$ and the PN $S_K$ of the PN shift registers $108_0$ are input during the first operating period to a multiplier to execute multiplication $C_{K+1} \cdot S_K$. The resulting product is summed with $C_1 \cdot S_0$ resulting in ($C_1 S_0 + C_{K+1} S_K$).

The correlator #1 of the correlator block $101_0$ is fed with the 0th PN $S_0$ via the delay element (T), and correlation thereof with the read-out signal $C_{K+1}$ is calculated.

In the correlator #0 of the correlator block $101_1$, multiplication $C_{K+1} \cdot S_{K+1}$ of the received signal $C_{K+1}$ and the second PN $S_{K+1}$ of the PN shift register $108_1$ is executed and the resulting product is summed with $C_1 \cdot S_1$.

During the first operating period, the correlator #1 of the correlator blocks $101_1$ is fed through a delay element (T) with the 0th PN $S_1$ to multiply it with $C_{K+1}$.

In this manner, for the Kth operation, $C_{K-1}, C_{2K-1}, C_{3K-1}, \ldots$, are read out from the received signal storage memory 104 and correlation thereof with PN is calculated in each correlator block.

By the above-described K operations of calculations of the correlation values, the first-stage correlators 101 calculate the correlation values corresponding to respective signatures of the period of (M+L/K)×K=MK+L=N+L chip periods.

FIG. 7 shows an overview of the output results of the correlation values output by the first state correlator 101 in a tabulated form. The correlation values are stored in a correlation value storage memory 109.

During writing of the correlation values output by the first-stage correlators 101 in the correlation value storage memory 109, the correlation value storage memory controller 110 controls the write address to write the correlation values output from the first-stage correlators 101.

The correlation value storage memory controller 110 at this time generates write addresses derived from the suffices BY for the correlation values $D_X U_Y$ shown in FIG. 7 to store the so-generated write addresses in the correlation value storage memory 109.

The correlation value storage memory controller 110 reads out K correlation values $D_0 U_0$, $D_0 U_1$, $D_0 U_{K-1}$ from the correlation value storage memory 109 to send the read-out correlation values to the second correlator 102. The second correlator calculates the correlation between the correlation values of the length K with the signature and, from the output results of the correlation values from the second stage correlator 102, detects the signature pattern from the second stage correlator. On detection of the signature pattern, the second correlator 102 outputs a fixed pattern detection signal 113.

If, in a first embodiment of the present invention, the first-stage correlators 101 are provided with K correlator blocks $101_0$ to $101_{K-1}$, and the first-stage correlators 101 calculates the correlation values for M+L/K chips, the number of times of readout from the received signal storage memory 104 is M+L/K, so that, for the entire K stages, the number of times of readout operations is equal to M+L/K so that, for the entire K operations, it is (M+L/K)×K=N+L.

By constructing the respective correlator blocks $101_0$ to $101_{K-1}$ by L/K+1 correlators, and by calculating, in the respective correlator blocks, the correlation values of the PN sequences, delayed from correlator to correlator in synchronism with the received signal readout period, with the read-out received signals, by L/K+1 correlators, the number of times of readout operations from the received signal storage memory 104 is N+L.

If, in a Preferred embodiment of the present invention, there exist Plural signature patterns, plural sorts of the signatures can be detected simultaneously by using the first-stage correlators 101 in common and by providing plural correlators 0# to #S in association with the number of sorts of the signature patterns, as shown in FIG. 1. By this configuration, the circuit scale can be diminished as compared to the case in which there are provided plural sets of correlators each with a length K×M in meeting with the plural sorts of the signature patterns.

In the first stage correlator, each correlator block includes plural correlators connected in Parallel. In such case, the circuit scale is increased substantially in proportion to the number of the correlators. So, the number of the correlators arranged in parallel in the correlator block may be optionally set depending on the type of the systems used.

A second embodiment of the present invention is explained. FIG. 9 shows a configuration of the second embodiment of the present invention. Referring to FIG. 9, showing the second embodiment of the present invention, the K correlator blocks (##0) $101_0$ to (##K−1) $101_{K-1}$ of the first-stage correlator 101 include L/(n×K)+1 correlators (#0 to #L/(n×K)), in distinction from the configuration of the previous embodiment (first embodiment) explained with reference to FIG. 1. The number of the correlators arranged in juxtaposition in each correlator block is reduced to approximately 1/n of that of the above-described first embodiment. It is noted that L is the indefinite time width of the predicted reception timing of the received signal and is to be an integer divisible by (n×K)

For example, if the indefinite time width L=512, the length K of the signature pattern is K=16, each correlator block includes L/K+1=33 correlators, so that 16×33=528 correlators are required for the 16 correlator blocks in their entirety. However, in the second embodiment of the present invention, if n=2, as an example, each of 16 correlator blocks is made up of L/K+1=17 correlators, such that, for the 16 correlator blocks, a sum total of 16×17=272 correlators are required for 16 correlator blocks, such that the circuit scale is substantially halved as compared to the previous embodiment, insofar as the correlators are concerned.

Figure 10:
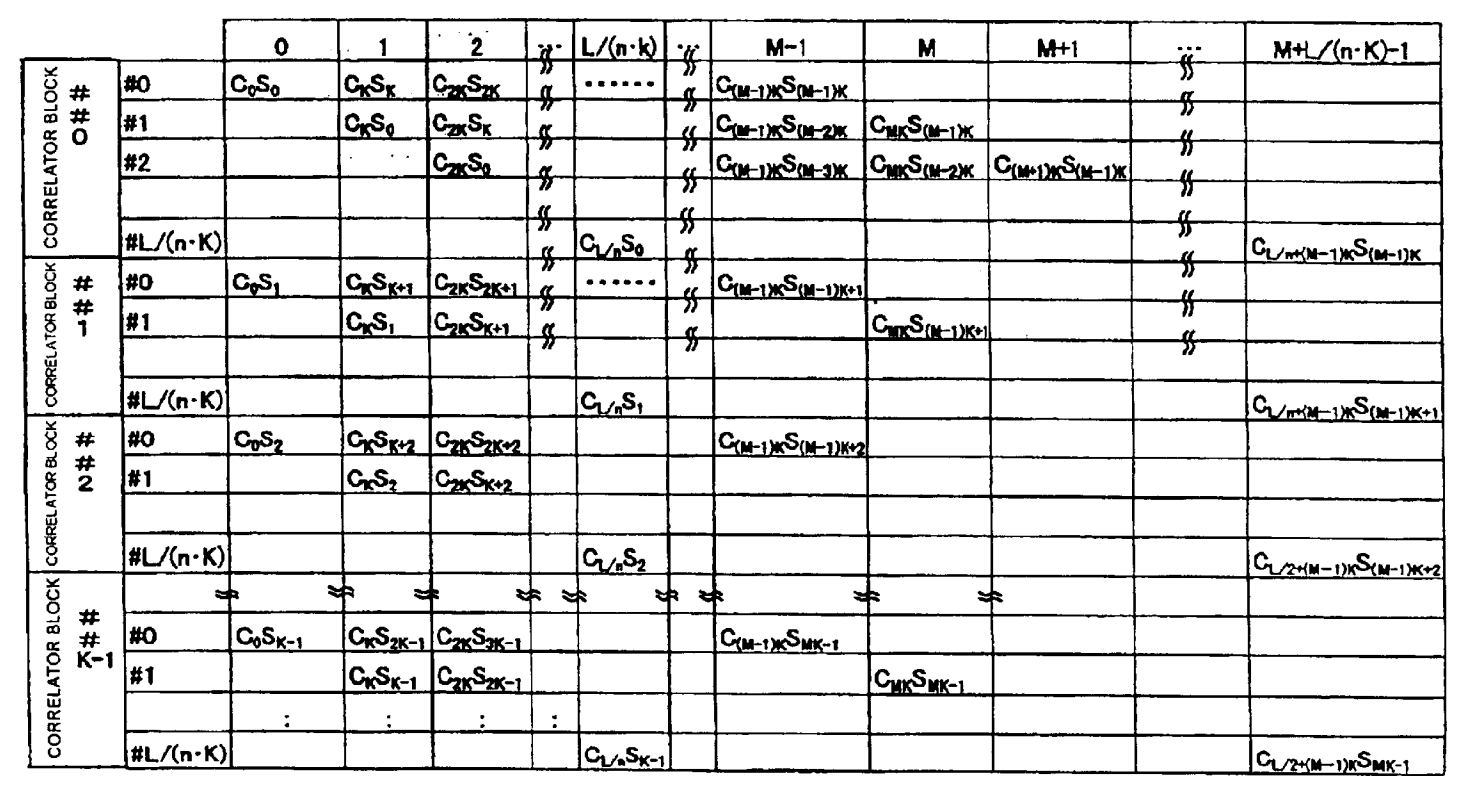

FIG. 10 shows, by an overview, the readout of the first received signal sequence ($C_0$, $C_K$, $C_{2K}$, . . .) and input signal pairs to the multiplier of the correlation values in the correlator of each correlator block. In FIG. 10 the abscissa denotes an operating Period for M+L/(n×K) periods. In the following, the points of difference from FIG. 5 are explained.

Referring to FIG. 10, in the L/(n·K) th period, where a symbol denotes "×", reception data $C_{L/n}$ of the (L/(n×K))×K=L/nth chip is sent to the correlator blocks $101_0$, $101_1$, . . . , $101_{K-1}$ in their entirety. The correlators #L/(n·K)+1 of the correlator blocks $101_0$ to $101_{K-1}$ are fed with PNs $S_0$ to $S_{K-1}$ of the PN shift registers $108_0$ to $108_{K-1}$ for multiplication with the received signal $C_{L/n}$.

The correlation value from the correlator #0 of the correlator block $101_0$, output during the (M−1)st period, is $C_0 S_0 + C_K S_K + \ldots + C_{(M-1)K} S_{(M-1)K}$, whilst the correlation value from the correlator #1, output during the Mth period, is $C_K S_0 + C_{2K} S_K + \ldots + C_{(M-1)K} S_{(M-2)K} + C_{MK} S_{(M-1)K}$. The correlation value from the correlator #L/(n·K)−1, output during the (M+L/(n·K)−2) nd period, is $C_{L/n} S_0 + C_{L/n+K} S_K + \ldots + C_{L/n+(M-1)K} S_{K-1)K}$, and is equivalent to the 0th signature ($U_0$) of the L/nth chip ($D_{L/n-1} U_0$; delay L/n, signature $U_0$).

The second received signal sequence ($C_1$, $C_{K+1}$, $C_{2K+1}$, . . .) is data offset by one chip from the first one. The Kth received signal sequence ($C_{K-1}$, $C_{2K-1}$, $C_{3K-1}$, . . .) is processed for correlation value calculation by the above-described sequence of operations, so that correlation value outputs shown as an overview in FIG. 11 are output from the first stage correlators 101. That is, correlation values for {M+L/(n×K)}×K=N+L/n chip periods are output. These correlation value outputs are once stored in the correlation value storage memory 109 and correlation thereof with the signature pattern is determined in the second stage correlator 102.

The readout positions of the received signal storage memory 104 are then offset by L/n+1 to execute the processing which is the same as discussed above to give a result $D_{L/n+1+x} U_y$ corresponding to the output result of the correlation value $D_X U_Y$ of FIG. 11 with the suffix x of $D_x$ set to L/n+1+x. By executing the processing a plurality of numbers of times; with the readout positions of the received signal storage memory 104 are then offset by L/n+1, it is possible to calculate the correlation values for an indefinite time width (range) L of an optional length and to detect the fixed pattern by signature pattern detection.

Meanwhile, the fixed pattern detection circuits, shown in the above-described embodiments, can be applied to a synchronization acquisition circuit configured for detecting the synchronization by correlation-detecting e.g., synchronization patterns.

The meritorious effects of the present invention are summarized as follows.

According to the Present invention, as described above, in which the correlators for detecting the signature pattern, divided by chip rates and re-arrayed (scrambled) are configured in two stage correlators comprised of first-stage correlators of a length of M chips and second-stage correlators designed to calculate correlation with respect to a fixed word from the output of the first-stage correlators, it is possible to shorten the time involved in detecting signature patterns.

Moreover, according to the present invention, in which the processing of calculating the correlation values by the first-stage correlators is repeated for plural sections (or domains) divided from an indefinite period L where there exists the signature pattern, to obtain required correlation values, the fixed pattern can be detected for an optional L, which is an integer divisible by K, in case each correlator block is made up of a preset number of correlators. For example, the circuit scale can be diminished by configuring each of the first-stage correlators by L/(n×K)+1 correlators, where n is a preset integer for which L/(n×K) is an integer.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A device for detecting a fixed pattern, said device being fed with received signals with a pattern of a length of N chips, said received signals being obtained on dividing and re-arraying each of K symbols in terms of a chip period as a unit, K being a preset positive integer, each of said symbols being spread with a spread code at a rate of M chips per symbol, M being a preset positive integer, and on repeatedly inserting into the re-arrayed symbols a signature pattern of a length K having one chip period as a unit, by M times, where N=K×M, said signature pattern being detected from said received signal, said device comprising:

first-stage correlators taking correlation between M received signals spaced apart from one another by every K chips, and M spread code sequences obtained on jumping a spread code sequence of a length N by every Kth chip to output correlation values associated with K signatures, respectively; and second-stage correlators taking correlation between the correlation values associated with K signatures output by said first-stage correlators and a pre-defined signature pattern.

2. The device according to claim 1 wherein said first-stage correlators are each fed with a spread code sequence of a length M obtained on decimating and re-arraying a spread code sequence of a length N generated by a spread code generator at every K chips and classifying the re-arrayed sequence into K to output correlation values associated with K signatures.

3. The device according to claim 2, wherein said first-stage correlators comprise K correlator blocks made up of a plurality of (R+1) correlators of a length M arranged in parallel with one another; and in each of the correlator blocks, the first correlator of said (R+1) correlators is fed with M received signals every K chips and said spread code sequence to take correlation of a length M, the second correlator is fed with M received signals, at every K chips, having the received signal supplied to the first correlator of said (R+1) correlators as second data, as leading end data, and with a spread code sequence which is said spread code sequence supplied to said first correlator delayed by a delay element in synchronism with an operating period, to take correlation with a length equal to M, such that the (R+1)st correlator is fed with M received signals at every K chips, having the received signal supplied to said (R+1)st correlator as second data, as leading end data, and with a spread code sequence which is said spread code sequence supplied to said first correlator and delayed by R delay elements in synchronism with an operating period, to take correlation with length equal to M.

4. The device according to claim 3 which, in calculating correlation values shifted chip by chip for N+L chips, where L, which is an integer divisible by K, denotes an indefinite time range where there exists said signature pattern wherein each of K correlator blocks has L/K+1correlators of a length M and arranged in parallel.

5. The device according to claim 3 in which, calculating correlation values shifted chip by chip for N+L chips, where L, which is an integer divisible by K, denotes an indefinite time range during which there exists said signature pattern, wherein each of K correlator blocks has L/(n×K)+1 correlators of a length M, arranged in parallel, where n is an integer not less than 2 provided that L is divisible by n×K.

6. A device for detecting a fixed pattern, said device being fed a received signal with a pattern of a length of N chips, said received signal being obtained on dividing and re-arraying each of a plurality of K symbols in terms of a chip period as a unit, each of said symbols being spread with a spread code at a rate of M chips per symbol, M being a preset positive integer, and on repeatedly inserting into the re-arrayed symbols a signature pattern of a length K having one chip period as a unit, by M times, where N=K×M, said signature pattern being detected from said received signals, said device comprising:

a received signal storage memory transiently storing received signals for at least N+L chips where L, which is an integer divisible by K, denotes an indefinite time range during which there exists said signature pattern;

a spread code generator generating a spread code;

a spread code re-arraying unit jumping and re-arraying the spread code generated by said spread code generator;

a received signal storage memory controller controlling readout from said received signal storage memory;

first-stage correlators comprised of K juxtaposed correlator blocks, each block being of an M chip length;

K spread code shift registers storing the spread code sequence re-arrayed by said spread code re-arraying unit to shift-output said spread code sequence to said K correlator blocks, respectively, of said first-stage correlators;

each of said correlator blocks of said first-stage correlators being fed with a spread code sequence from the spread code shift register associated with each of said correlator blocks, each of said correlator blocks outputting a correlation value of the received signal read out from said received signal storage memory and said spread code sequence;

a correlation value storage memory storing the correlation value output from said first stage correlators;

a correlation value storage memory controller controlling writing of the correlation value output from the first-stage correlators and reading out of the correlation value from said correlation value storage memory;

a signature pattern storage unit storing and holding a preset signature pattern;

second-stage correlators calculating correlation values between the correlation values read out by said correlation value storage memory controller and said signature pattern stored in said signature pattern storage unit; and a signature detector detecting the signature from the correlation value output from said second-stage correlators to output a fixed pattern detection signal.

7. The device according to claim 6 which, in calculating correlation values shifted chip by chip for N+L chips, where L, which is an integer divisible by K, denotes an indefinite time range during which there exists said signature pattern, the fixed pattern detection device having L/K+1 correlators arranged in a juxtaposed fashion, each with a length equal to M, wherein said (L/K+1) correlators are arrayed in blocks, and in each of the correlator blocks, the first correlator of said L/K+1 correlators is fed with M received signals read out from said received signal storage memory, at every K chips, and said spread code sequence, to take correlation of a length M; and the second correlator is fed with M received signals, at every K chips, having the received signal as supplied to said first correlator as second data, as leading end data, and with a spread code sequence which is said spread code sequence supplied to said first correlator delayed by a delay element in synchronism with an operating period, to take correlation with a length equal to M, wherein the (L/K+1)st correlator is fed with M received signals at every K chips, having the received signal as supplied to the L/Kth correlator as second data, as leading end data, and with a spread code sequence which is said spread code sequence supplied to said first correlator and delayed by L/K delay elements in synchronism with an operating period, to take correlation with a length equal to M.

8. The device according to claim 6 wherein each said K correlator blocks is made up of a plurality of (R+1) correlators, each of a length M, arranged in parallel with one another;

in each of said correlator blocks, the first correlator of said (R+1) correlators is fed with M received signals at every K chips and said spread code sequence as read out from said received signal storage memory to take correlation of a length M; and the second correlator is fed with M received signals, at every K chips, having the received signal as supplied to said first correlator as second data, as leading end data, and with a spread code sequence which is said spread code sequence supplied to said first correlator from the spread code register and delayed by a delay element in synchronism with an operating period, to take correlation with a length equal to M, wherein the (R+1)st correlator is fed with M received signals at every K chips, having the received signal supplied to said Rth correlator as second data, as leading end data, and with a spread code sequence which is said spread code sequence supplied to said first correlator and delayed by R delay elements in synchronism with an operating period, to take correlation with a length equal to M.

9. The device according to claim 8 wherein each of said K correlator blocks has L/(n×K)+1 correlators arranged in parallel, where n is such an integer which is not less than 2 and which renders L divisible by n×K.

10. The device according to claim 8 in which, in calculating correlation values shifted chip by chip for N+L chips, where L, which is an integer divisible by K, denotes an L chip range that is an indefinite time range during which there exists said signature pattern, calculating the correlation values in said K correlator blocks is obtained by dividing said L to obtain correlation values in an N+L chip range.

11. The device according to claim 6 wherein a plurality of said second stage correlators are provided in association with plural sorts of signature patterns.

12. The device according to claim 6 wherein said spread code re-arraying unit is configured for variably re-arraying the spread code generated in said spread code generator responsive to the re-arraying state of said signature pattern for distribution to said K spread code shift registers.

13. A CDMA reception apparatus comprising the device for detecting a fixed pattern as claimed in claim 1.

14. A spread spectrum communication apparatus comprising a detection device for detecting a signature pattern from a received signal, said detection device being fed with received signals with a pattern of a length of N chips, wherein signature pattern of a length K with a one-chip period as a unit is repeatedly inserted M times, said signature pattern, being obtained on dividing and re-arraying each signature of K symbols each being spread with the spread code at a rate of M chips per symbol, said device comprising:

first-stage correlators taking correlation between M received signals spaced apart from one another at every K chips, and M spread code sequences obtained on decimating a spread code sequence of a length N at every K chips to output correlation values associated with K signatures; and second-stage correlators taking correlation between the correlation values associated with K signatures output by said first-stage correlators and a pre-defined signature pattern.

* * * * *